United States Patent [19]

Karsan

[11] 4,019,333
[45] Apr. 26, 1977

[54] APPARATUS AND METHOD FOR BUFFERING SUBMERGED CONDUITS

[76] Inventor: Demir I. Karsan, 33 Oaken Lane, London, England

[22] Filed: Dec. 24, 1975

[21] Appl. No.: 644,183

[52] U.S. Cl. .................................. 61/110; 166/6; 285/61; 285/64; 166/.6
[51] Int. Cl.² ...................... F16L 1/00; F16L 51/00
[58] Field of Search ............ 61/72.3, 72.1, 69, 110, 61/111; 285/61, 64; 138/106

[56] References Cited

UNITED STATES PATENTS

| | | | |
|---|---|---|---|
| 3,641,777 | 2/1972 | Banjavich | 61/72.3 |
| 3,730,228 | 5/1973 | Gibbs, Sr. | 138/106 |
| 3,835,655 | 9/1974 | Oliver | 61/72.3 |
| 3,870,345 | 3/1975 | Liautavd | 166/0.5 X |

Primary Examiner—Jacob Shapiro

[57] ABSTRACT

To connect two submerged conduits (e.g., a pipeline and a riser), a buffer unit is placed intermediate the two conduits. the buffer unit comprises an enclosure having a projecting conduit segment for attachment to each of the submerged conduits. An expansion mechanism is supported in the enclosure and interconnects the projecting conduit portions. The internal structure of the enclosure is such as to accommodate movement of the expansion mechanism (to accommodate, for example, thermal expansion or contraction of one of the submerged conduits), thereby isolating each of the submerged conduits from forces experienced by the other. Also disclosed are the use of positioning mechanisms to change the orientation of the expansion mechanism within the enclosure in order to change the position and/or orientation of the projecting conduit portions to facilitate coupling to the submerged conduits.

15 Claims, 7 Drawing Figures

APPARATUS AND METHOD FOR BUFFERING SUBMERGED CONDUITS

BACKGROUND OF THE INVENTION

The present invention relates to the connection of submerged conduits and, more particularly, to a method and apparatus for interconnecting such conduits in a manner to substantially isolate each conduit from forces experienced by the other.

Establishing connections between submerged conduits has been a continuing problem over the years, typically requiring intricate coupling assemblies and/or the substantial use of divers to accomplish the connection. Additionally, where one of the conduits is relatively fixed (e.g., a riser secured to an underwater, tower, well head, etc.), rather than being simply the terminal portion of an elongated pipeline, the problem of alignment of the two conduits in order to make the appropriate connection therebetween is further complicated. With fixed conduits, of course, even after the complicated and expensive process of connecting the pipeline thereto, potentially damaging forces may be transmitted to the fixed conduit from the pipeline (e.g., thermal expansion or contraction of the pipeline). Such forces present a danger of loosening the connection established between the pipeline and the fixed conduit, damaging the fixed conduit or the structure to which it is secured, or even causing a shift in the position of the structure to which the fixed conduit is secured. The improved pipeline connection technique of Lochridge et al U.S. Pat. No. 3,599,436 (issued Aug. 17, 1971 and owned by the assignee of the present invention), involving the welding the two conduits in an underwater work chamber, does not, of itself, provide isolation of the fixed conduit from thermal expansion of the pipeline.

OBJECTS AND SUMMARY OF THE INVENTION

It is therefore a general object of the present invention to provide a method and apparatus for establishing connections between submerged conduits which overcome the problems of the sort previously noted.

It is a particular object of the present invention to provide a method and apparatus for making such a connection between the terminal portion of an elongated pipeline and a relatively fixed conduit, whereby the fixed conduit is substantially isolated from forces experienced by the pipeline.

It is an additional object to provide such method and apparatus for establishing a connection between a pipeline and a fixed conduit which facilitates the proper positioning and orientation of the conduit element which is to be directly connected to the fixed conduit.

A preferred form of the invention, intended to accomplish some of the foregoing objects, involves the provision of a buffer unit intermediate the terminal portions of the two submerged conduits to be connected, the unit including first and second conduit segments projecting from an enclosure. The first and second conduit segments are connectable to the two submerged conduits and conduit means are provided within the enclosure to interconnect the first and second conduit segments. Those conduit means include an expansion mechanism within the enclosure and the enclosure has an internal shape that accommodates movement of the expansion mechanism within the enclosure.

To facilitate the connection of one of the projecting conduit segments to a fixed external conduit (e.g., a riser secured to a deep-sea tower), means are provided for changing the orientation of the conduit means within the enclosure, thereby producing a concomitant change in position of the projecting conduit segment which is to be connected to the fixed external conduit.

BRIEF DESCRIPTION OF THE DRAWINGS

Other objects and advantages of the invention will become apparent from the following detailed description of particular preferred embodiments, as illustrated in the accompanying drawings, in which.

DETAILED DESCRIPTION OF PARTICULAR PREFERRED EMBODIMENTS

Figure 1:
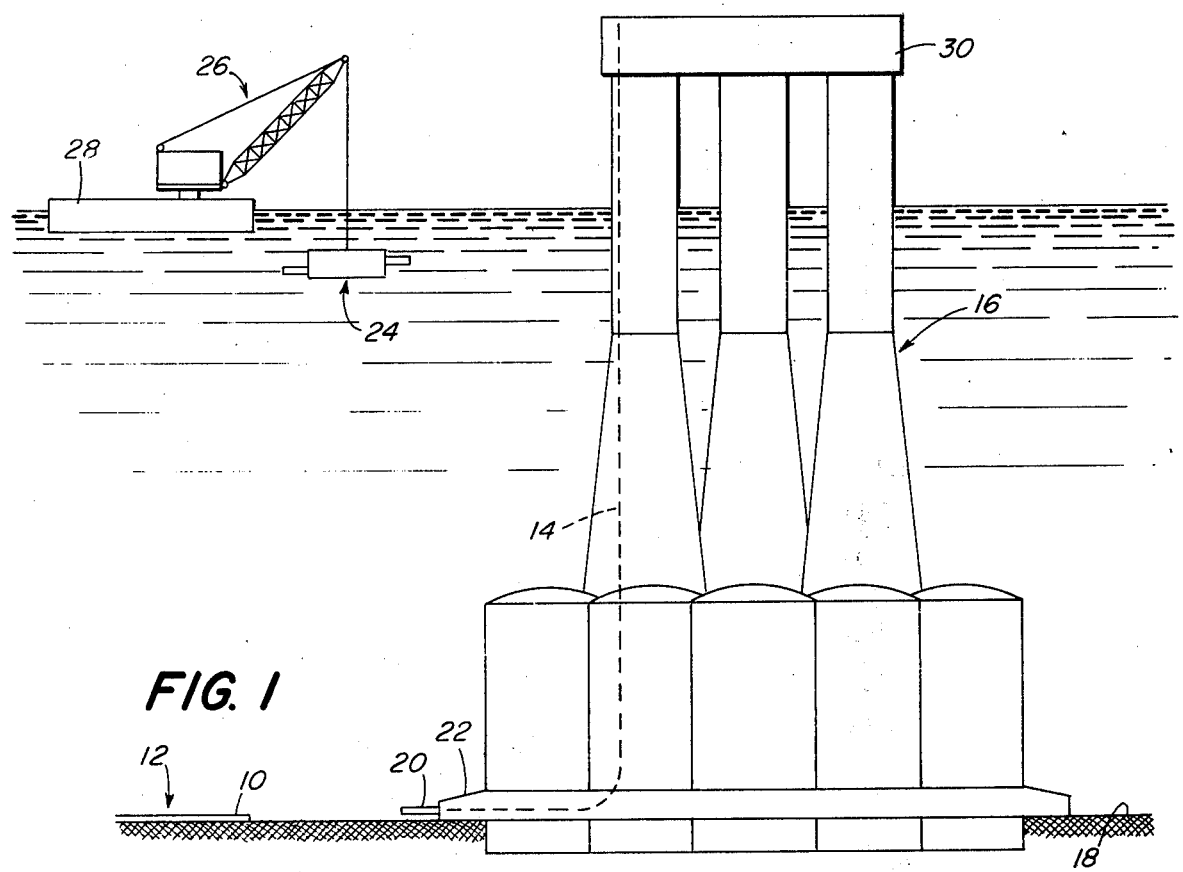
FIG. 1 is a schematic illustration of a deep-sea tower supporting a riser and of an adjacent pipeline terminal portion which is to be connected to the riser.
Figures 2, 3:
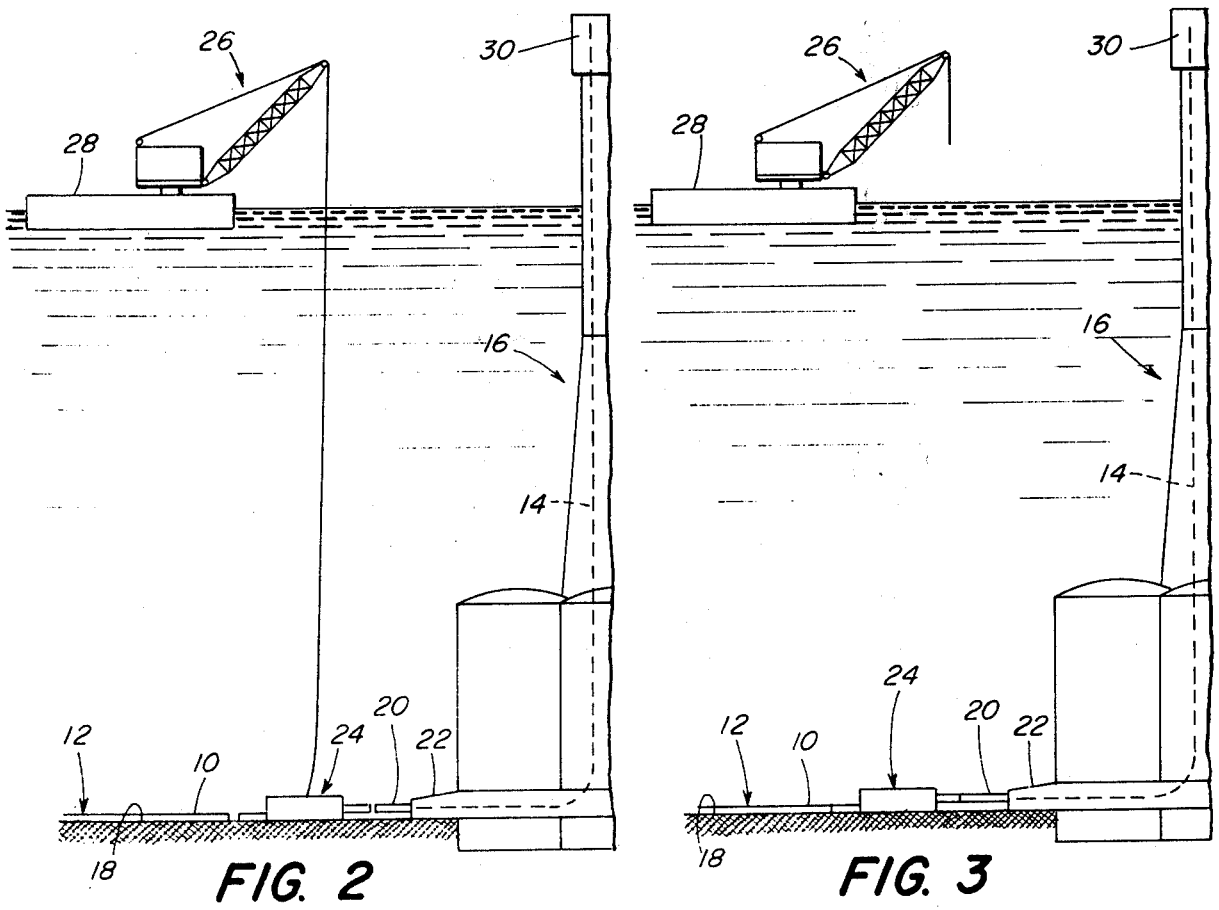
FIG. 2 is a view similar to FIG. 1 illustrating the positioning of a buffer unit according to the present invention intermediate the pipeline and the riser.
FIG. 3 is a view similar to FIG. 2 illustrating the buffer unit connected to both the pipeline and the riser.

FIGS. 1—3 illustrate a general environment particularly suited to the use of a buffer unit constructed in accordance with the present invention, as well as one technique for employing such a unit to establish communication between two submerged conduits. The first conduit is the terminal portion 10 of a submerged pipeline 12 which either rests on the floor 18 of the body of water or lies in a trench in that floor except for the terminal portion which rises up out of the trench. A riser 14 is secured to, or integral with, a deep-sea tower 16, which rests on the floor 18. A terminal portion 20 of the riser 14 projects from the concrete or steel base 22 of the tower 16 and, therefore, is a substantially fixed conduit. The terminal portions 10 and 20 of the pipeline 12 and riser 14, respectively, are separated to accommodate the positioning of a buffer unit 24 therebetween. (As discussed in greater detail below, in the embodiment illustrated in FIGS. 4–6, a separation of 60 feet between those terminal portions 10 and 20 is suitable.) The buffer unit 24 is supported by a crane 26 on a vessel 28 suitably positioned to lower the unit 24 between the terminal portions 10 and 20. Naturally, other means of lowering and positioning the unit 24 are equally suitable (e.g., a crane mounted on platform 30 of the tower 16). FIGS. 2 and 3 illustrate, respectively, unit 24 suitably positioned between the conduit terminal portions 10 and 20 and the unit 24 as finally connected to those terminal portions.

Figure 4:
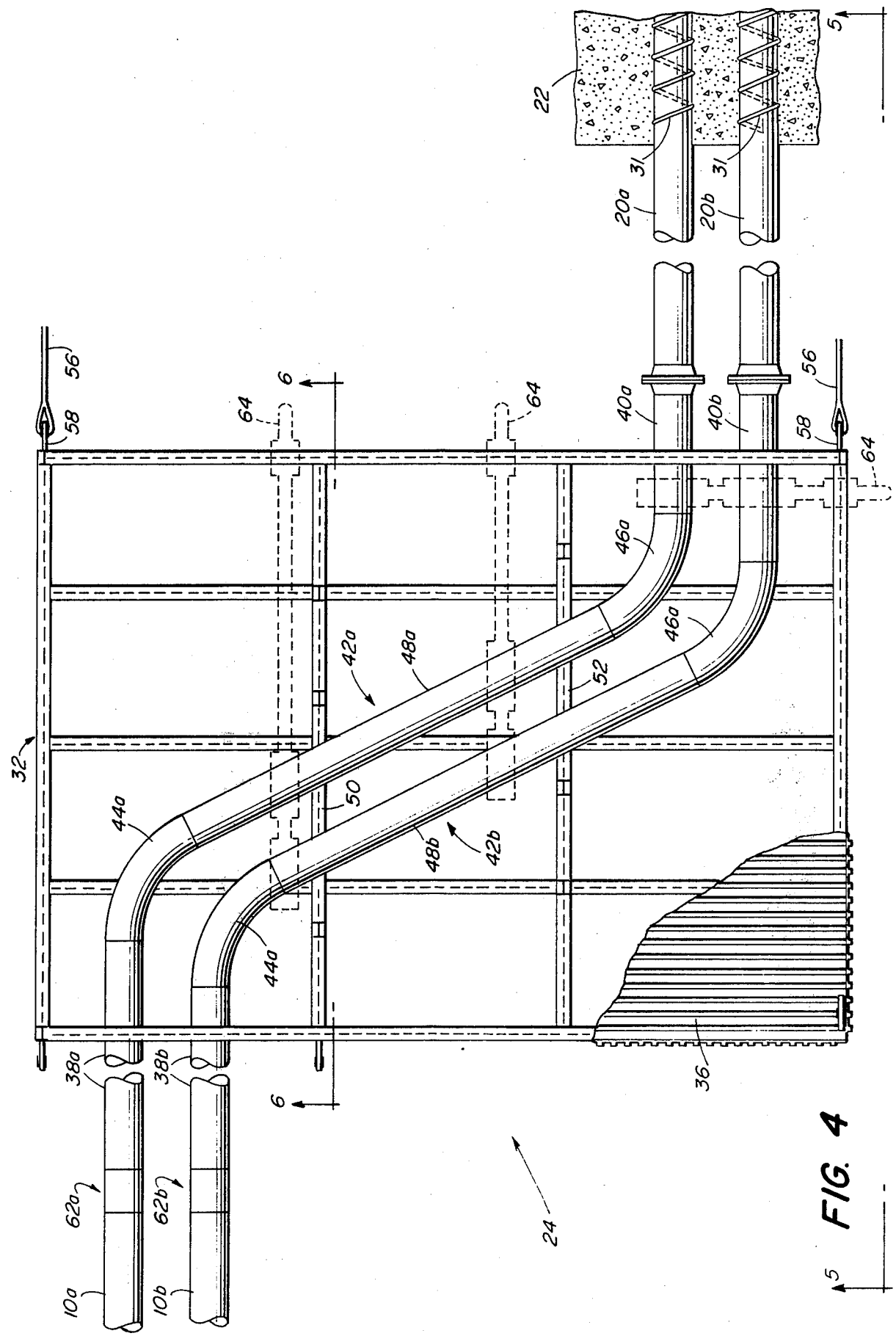
FIG. 4 is a partially broken away view taken at 4—4 of FIG. 3 illustrating the buffer unit according to the present invention as connected to the pipeline and to the riser.
Figure 5:
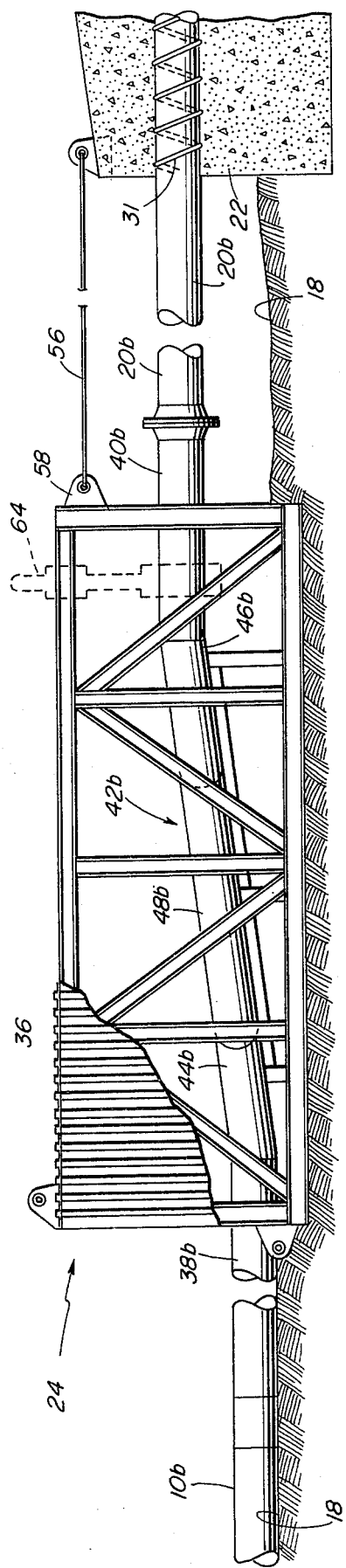
FIG. 5 is a partially broken away side elevation taken at 5—5 of FIG. 4.
Figure 6:
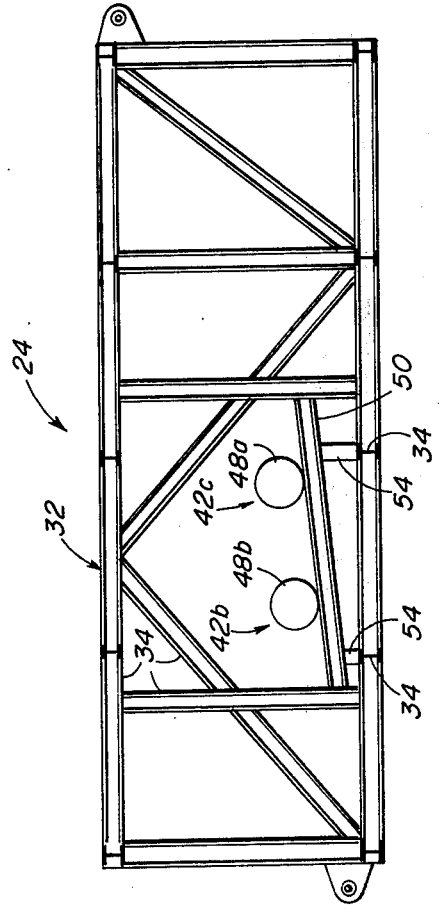
FIG. 6 is a view taken at 6—6 of FIG. 4.

Referring now to FIGS. 4–6, for the purposes of illustration there is shown a conventional arrangement in which there are actually a pair of adjacent pipelines having terminal portions 10a and 10b which are to be connected to terminal portions 20a and 20b of a pair of risers. Each of the riser portions 20a and 20b is embedded in the platform base 22 using conventional shear connectors 31.

The buffer unit 24 comprises a generally rectilinear box-like framework 32 of interconnected steel frame member 34 clad on all sides with sheets of ribbed steel 36 to provide an enclosure. At laterally and vertically offset positions on opposite sides of the unit 24, conduit segments 38a, 38b, and 40a, 40b project from the enclosure defined by the frame 32 and the overlying steel sheets 36. The lateral offset (visible in FIG. 4) of each pair of projecting conduit segments, 38a–40a and 38b–40b, accommodate an associated expansion mechanism 42a, 42b within the unit 24 interconnecting the conduit segments of each associated pair. In the illustrated embodiment, each expansion mechanism 42 comprises bent conduit segments 44 and 46 (e.g., number 6D bends) connected to the segments 38 and 40, respectively, and themselves connected by an intermediate straight conduit segment 48. As best seen in FIG. 6, the expansion mechanisms 42a, 42b are supported on spaced-apart bearing members in the form of steel ramps 50, 52 having their upper conduit-contacting surfaces coated with an antifriction material (e.g., polytetrafluoroethylene). Preferably, the ramps are adjustable in their vertical position and orientation to facilitate adjustment of the slope of each of the expansion mechanisms 42a, 42b within the enclosure. Any conventional means for such adjustment can be provided (e.g., adjustable supports 54 extending from the lower sides of ramps 50, 52 to a portion of the frame 32 therebelow).

As is evident from FIG. 6, a substantial clearance within the enclosure is provided adjacent each of the expansion mechanisms 42a, 42b in order to accommodate anticipated movement of the expansion mechanisms with respect to the enclosure as they absorb thermal expansion or contraction experienced by the pipeline 10a, 10b, thereby to a large degree isolating the risers and the tower from such forces.

As best seen in FIG. 5, the unit 24 can be anchored to the base 22 of the tower 16 by one or more cables 56 extending between brackets 58 and 60 mounted on the unit 24 and the base 22, respectively. (Alternatively anchoring schemes are possible, of course. For example, ballasting with crushed rock (i.e., "rip rap"), as discussed in U.S. Pat. No. 3,688,510, is a suitable anchoring technique.) FIG. 5 also illustrates the vertical offset of the projecting conduit portions 38b and 40b, which is required to accommodate the vertical discrepancy in the positions of pipeline terminal portion 10b (typically resting on the floor 18 of the ocean or other body of water) and the terminal portion 20b of the riser (most conveniently provided somewhat above the floor 18).

The size and shape of the unit 24 may, of course, vary with such factors as the size of the conduits, the number of parallel conduits provided, the geometrical configuration of the expansion mechanism employed (e.g., the expansion mechanism 42 illustrated in FIG. 4 could be replaced by any other conventional expansion mechanism such as a dogleg, a "U" configuration, etc.), etc. For 36 inch outer diameter pipe and the provision of two pipelines as in FIG. 4, the frame 32 may be approximately 60 feet by 40 feet. Additionally, it is preferable that the projecting conduit segments 38a, 38b at the inlet end of the unit 24 projecting at least 20 feet from the enclosure to permit adequate space for the employment of an underwater work chamber, as described in the above-mentioned Lochridge U.S. Pat. No. 3,599,436 to facilitate welded connections (as at 62a and 62b) between the pipeline terminal portions 10a, 10b and the associated projecting conduit segments 38a, 38b. The connection of projecting conduit segments 40a, 40b to the associated riser terminal portions 20a, 20b can be made in any conventional fashion such as the flanged connections shown in FIGS. 4 and 5.

Positioning mechanisms 64, of any conventional design, may be provided for engaging the various conduit portions within the enclosure of unit 24 for adjusting the position and/or orientation of the conduit means within the enclosure. Such means would be disengageable from the conduit means to allow free movement thereof and would supplement the control over the position and orientation of conduit menas within the enclosure that could be provided by units 54 (see FIG. 6). As such, these mechanisms would facilitate the positioning of projecting conduit segments 40a, 40b to the proper vertical, horizontal, and angular positions required for proper coupling to the riser terminal portions 20a, 20b.

With the unit 24 firmly anchored in place on the ocean floor (either by the cable system 56 illustrated in FIG. 5 or other means, such as ballasting), the unit 24 may serve as a "pulling point" for the laying of the pipeline 12 and for its ultimate connection to the projection conduit segments 38.

Figure 7:
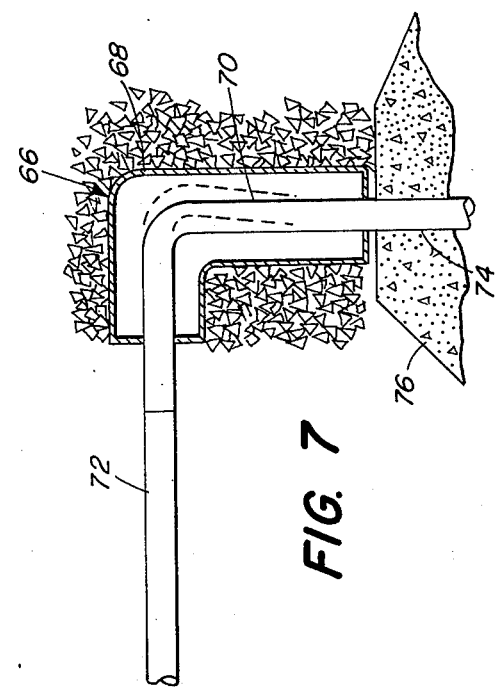
FIG. 7 is a schematic illustration of another buffer unit within the scope of the present invention.

FIG. 7 is presented to give an indication of the variety of buffer unit designs deemed within the scope of the present invention. FIG. 7 illustrates a buffer unit 66 in the form of a housing 68 surrounding, and spaced apart from, a dogleg-type expansion mechanism 70. The expansion mechanism communicates at an inlet end of the unit 66 with a pipeline 72 and at an outlet end of the unit 66 with a fixed conduit 74 embedded in a concrete structural member 76 (e.g., a tower base). As is conventional, the locus of connection of the pipeline 72 to the conduit 74 is embedded in a "rip rap" ballast. The enclosure 68, of course, permits thermal expansion or contraction of the pipeline 72 to be absorbed in the expansion mechanism 70 without being impeded by the ballast. Additionally, the ballast is not displaced, and thereby rendered less effective, over a period of time, as could occur through repeated movements of conduit in direct contact with the ballast.

SUMMARY OF ADVANTAGES AND SCOPE OF THE INVENTION

From the foregoing, it will be seen that the present invention provides a method and apparatus for connecting submerged conduits in a manner which substantially isolates each of the conduits from forces experienced by the other. This benefit is particularly significant, of course, where one of the conduits is a fixed conduit, so as to be relatively unyielding and susceptible to damage if displacement does occur.

Such fixed conduits have additionally present problems of connection to other conduits even absent considerations of thermally induced forces, since, in order to achieve alignment of the two conduits for the ultimate connection, only the other conduit can be readily moved, bent, etc. By providing convenient means for adjusting the position of the conduit means which, according to the present invention, are provided intermediate the pipeline in the fixed conduit, this problem is overcome.

As will be apparent to those skilled in the art, the particular form of enclosure for a buffer unit according to the present invention, as well as the particular type of expansion mechanism employed, can be varied without departing from the spirit and scope of the invention.

Although the invention has been described predominantly with reference to one preferred form, other forms are, of course, within the scope of the invention and the following claims.

What is claimed is:

1. A buffer unit for linking an underwater riser to an underwater pipeline, comprising
   an enclosure positioned intermediate said riser and said pipeline
   first and second conduit segments projecting from said enclosure for coupling to said riser and said pipeline, respectively, and
   conduit means within said enclosure connecting said first and second conduit segments and comprising an expansion mechanism;
   said enclosure having internal means that support, while permitting movement of, said expansion mechanism within said enclosure.

2. The buffer unit of claim 1 further including means for changing the orientation of said conduit means within said enclosure, thereby enabling a change of position of said first conduit segment relative to said enclosure.

3. The buffer unit of claim 1 wherein said conduit means are supported by said internal means within said enclosure only at spaced apart locations.

4. The buffer unit of claim 3 wherein said conduit means are supported by at least one main bearing member having a surface for contact with said conduit means which has a low frictional resistance to sliding movement of said conduit means on said surface.

5. The buffer unit of claim 4 wherein said surface comprises a resin coating on said main bearing member.

6. The buffer unit of claim 5 wherein said coating is a polytetrafluoroethylene.

7. The buffer unit of claim 1 wherein said enclosure comprises a substantially rectilinear network of frame members and exterior walls secured to said frame members.

8. A buffer unit of claim 7 wherein said first and second projecting conduit segments are laterally offset on opposite sides of said enclosure.

9. The buffer unit of claim 8 wherein said expansion mechanism comprises a bent conduit segment connected to each of said first and second projecting conduit segments and a central conduit segment connecting said two bent conduit segments.

10. An expansion buffer unit for interconnecting first and second submerged conduits comprising
    an enclosure for placement intermediate said submerged conduits,
    first and second conduit segments projecting from said enclosure for coupling to, respectively, said first and second submerged conduits, and
    conduit means within said enclosure connecting said first and second conduit segments and comprising an expansion mechanism;
    said enclosure having internal means that support, while permitting movement of, said expansion mechanism within said enclosure.

11. The method of linking an underwater pipeline to an underwater riser, comprising
    providing an enclosure having first and second spaced-apart projecting conduit segments and conduit means within said enclosure connecting said segments and including an expansion mechanism,
    positioning said expansion mechanism within said enclosure to permit movement of said expansion mechanism within said enclosure,
    positioning said enclosure adjacent said riser with said first conduit segment substantially aligned with said riser,
    linking said first conduit segment to said riser in a leak-proof connection, and
    linking said second conduit segment to said pipeline in a leak-proof connection.

12. The method of claim 11 wherein said enclosure is substantially rectilinear in shape and said expansion mechanism is positioned substantially diagonally within said enclosure.

13. The method of claim 11 wherein said riser is provided in a fixed submerged structure and said step of positioning said enclosure adjacent said riser includes securing said enclosure to said structure.

14. The method of claim 11 wherein said step of positioning said enclosure adjacent said riser comprises submerging said enclosure to a location on the floor of the body of water adjacent said riser and then ballasting said enclosure.

15. The method of interconnecting first and second submerged conduits comprising
    providing an expansion mechanism intermediate said first and second submerged conduits,
    connecting each of said first and second submerged conduits to a respective end of said expansion mechanism,
    enclosing said expansion mechanism within a housing shaped to permit movement of said expansion mechanism within said housing.

* * * * *

UNITED STATES PATENT AND TRADEMARK OFFICE
CERTIFICATE OF CORRECTION

PATENT NO. : 4,019,333
DATED : April 26, 1977
INVENTOR(S) : Demir I. Karsan

It is certified that error appears in the above-identified patent and that said Letters Patent are hereby corrected as shown below:

Add Assignment information as follows:

--Assignee: Brown & Root, Inc., Houston, Texas --.

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*